No. 866,494. PATENTED SEPT. 17, 1907.
C. LOESCH & E. C. McCALL.
CONTINUOUS BAKING OVEN.
APPLICATION FILED DEC. 31, 1906.
4 SHEETS—SHEET 1.
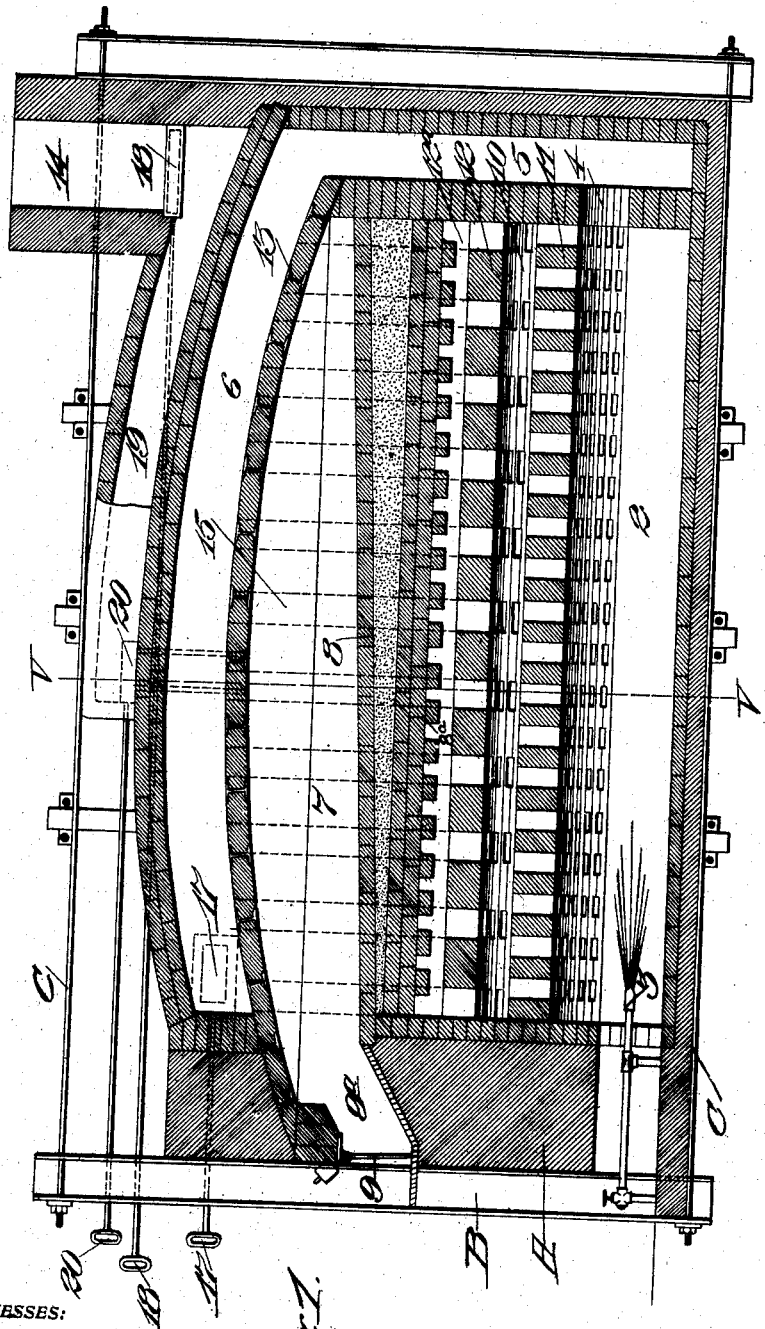

No. 866,494. PATENTED SEPT. 17, 1907.
C. LOESCH & E. C. McCALL.
CONTINUOUS BAKING OVEN.
APPLICATION FILED DEC. 31, 1906.
4 SHEETS—SHEET 2.
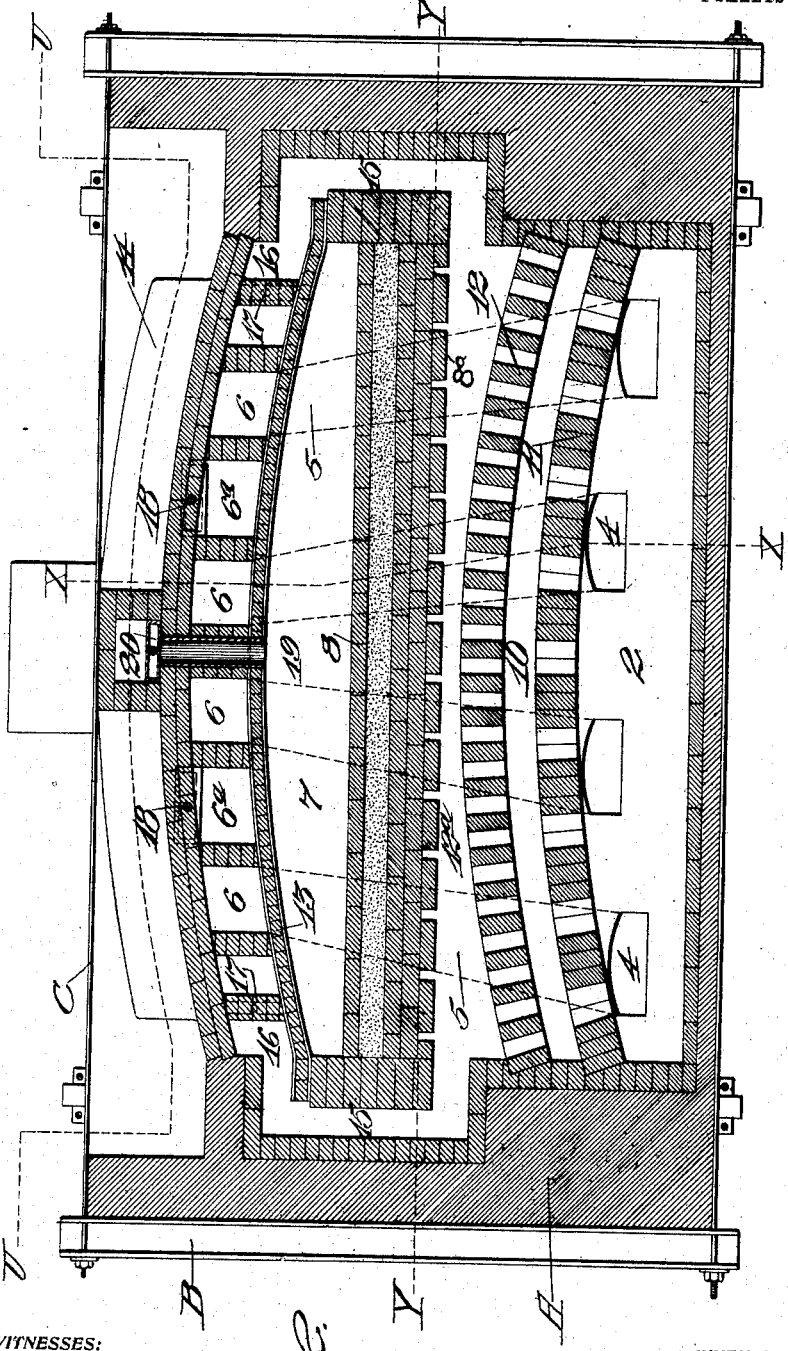
WITNESSES:
INVENTORS
Charles Loesch and
BY Elvin C. McCall
Geo. H. Strong
ATTORNEY
THE NORRIS PETERS CO., WASHINGTON, D. C.

No. 866,494. PATENTED SEPT. 17, 1907.
C. LOESCH & E. C. McCALL.
CONTINUOUS BAKING OVEN.
APPLICATION FILED DEC. 31, 1906.
4 SHEETS—SHEET 3.
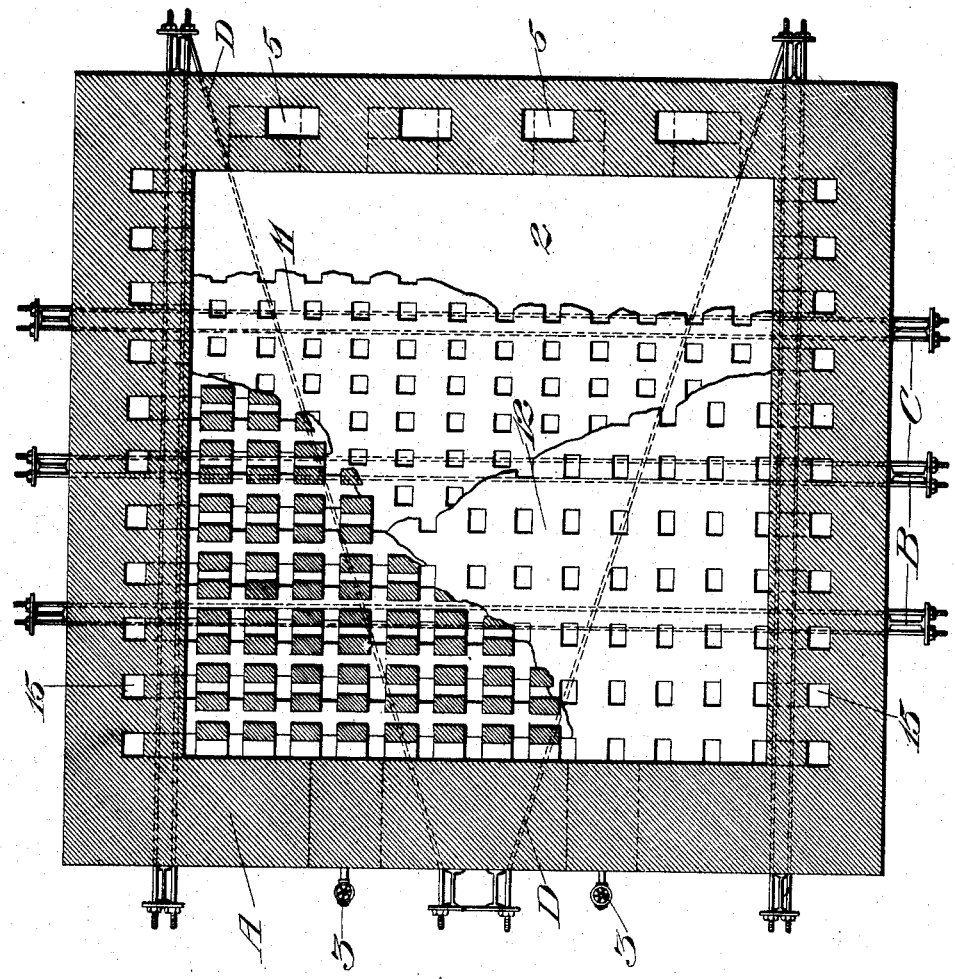
WITNESSES:
INVENTORS
Charles Loesch and
BY Elvin C. McCall
Geo. H. Strong,
ATTORNEY

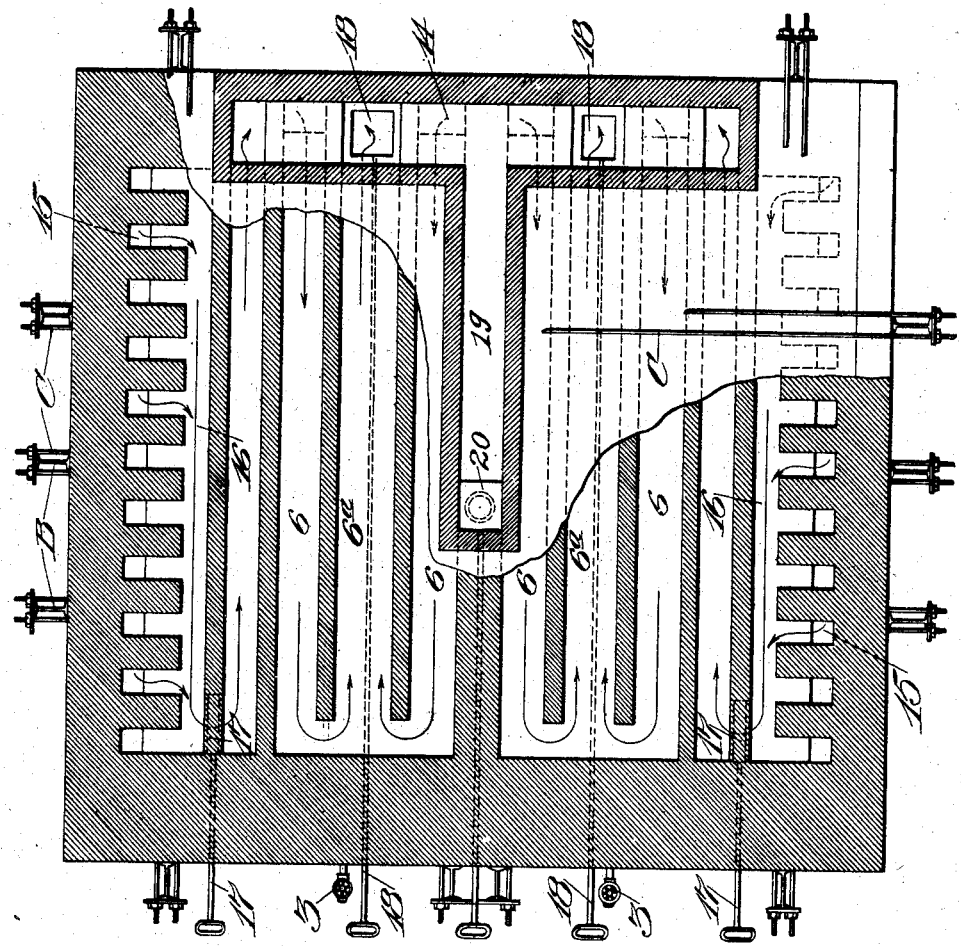

UNITED STATES PATENT OFFICE.

CHARLES LOESCH AND ELVIN C. McCALL, OF SAN FRANCISCO, CALIFORNIA.

CONTINUOUS-BAKING OVEN.

No. 866,494.     Specification of Letters Patent.     Patented Sept. 17, 1907.

Application filed December 31, 1906. Serial No. 350,301.

*To all whom it may concern:*

Be it known that we, CHARLES LOESCH and ELVIN C. McCALL, citizens of the United States, residing in the city and county of San Francisco and State of California, have invented new and useful Improvements in Continuous-Baking Ovens, of which the following is a specification.

Our invention relates to an oven for baking bread and like substances, and especially in large quantities.

It consists in the combination of parts, and in details of construction which will be more fully explained by reference to the accompanying drawings, in which—

Figure 1 is a longitudinal section on line $x$—$x$ of Fig. 2. Fig. 2 is a cross section on line $v$—$v$ of Fig. 1. Fig. 3 is a plane section on line $y$—$y$ of Fig. 2, broken away to expose the arches, and fire-box. Fig. 4 is a section on line $u$—$u$ of Fig. 2, broken away to expose the top flues.

Our invention is designed to provide a baking oven with a heating furnace adapted for the use of a hydrocarbon fuel, and in connection therewith of distributing and equalizing chambers, passages and dampers whereby a steady and even heat may be maintained throughout the oven; or when desired the heat may be concentrated upon one part for purposes of more rapid cooking.

The structure A may be built of masonry having the inclosed strengthening beams B and tie rods C connecting the beams as shown.

In connection with the rectangularly arranged beams and tie-rods, I have also shown the diagonal tie-rods D extending from front to rear in the base of the structure.

In the lower part of the structure is located the arched furnace 2, into the front end of which one or more hydrocarbon burners are introduced as at 3. The products of combustion serve to heat this chamber, and at the rear end may pass out through passages 4 which open into the vertical passages 5 at the rear, and may be conducted into the arched chamber 6 which is located above the baking oven 7.

This baking oven has an inclined floor at 8; the lowest part being in front and contiguous to the door-opening 9, and the higher part at the rear. The door-opening may extend entirely across the front of the baking oven, and by thus occupying the full width of the oven it is possible to properly arrange the loaves of bread or other wares to be baked without introducing them angularly as would have to be done with the narrow door-opening.

The door-opening 9 is here shown as depressed below the level of the front end of the floor 8, and is connected therewith by an upwardly inclined passage as at $9^a$; the top of the door opening being just above the level of the floor so that the interior of the baking chamber may be easily inspected, while by reason of the low position of the door-opening, the tendency of the heat to escape from this chamber is largely prevented.

The oven is here shown as arched in both directions forming a dome-shaped chamber highest in the center.

The floor may be of brick, or any suitable equivalent heat-retaining material, and may be built upon gravel or equivalent filling below, or the filling below the floor may be of solid masonry; the object being in any event to provide a material which will readily absorb and retain heat.

Above the arched furnace chamber 2 is a second arched chamber 10, and the two chambers are separated from each other by a brick or equivalent checker-work 11, the construction of which is plainly shown in Fig. 3. This checker-work floor is so constructed as to provide a great number of openings through which heat may readily arise from the furnace chamber 2 into the chamber 10.

Above the chamber 10 is a roof 12 which is interposed between said chamber and the floor of the baking chamber, this roof having passages made through it so that the heat from the chamber 10 may be evenly distributed against the flooring of the oven, through the openings $12^a$.

By the arrangement of the checker-work 11, the chamber 10 and the roof 12, the heat of the burners is very evenly distributed and equalized so that when it comes in contact with the floor of the oven, the latter can be equally heated in all parts, and the mass of masonry is such as to hold the heat for a long time so that by admitting and igniting the fuel for a comparatively short time, the oven will be heated so as to continue its work for a long time without further heating.

In order to allow the heat to more thoroughly penetrate and permeate the floor of the baking chamber, that portion $8^a$ forming the bottom of that floor and contiguous to the reticulated arch 12 is formed of bricks separated from each other, and projecting downwardly into the chamber beneath, as shown in Figs. 1 and 2. The heat from this chamber, entering these spaces may circulate around and between the bricks as shown in the left upper corner of Fig. 3, thus insuring an even distribution of heat to the baking floor, which cannot be effected by any disposition of lanes or channels.

The heat passing up from the chamber 2 through the passages 5 as previously described, and admitted into the space 6 above the top of the baking chamber, serves to heat the top of this chamber, which is arched as before described, and constructed with girders 13, and masonry work supported thereby.

In transverse section Fig. 2 we have shown in dotted lines the direction of the passages 5 from the openings 4 of the chamber 2 to the passages 6 above the baking chamber. These passages 6 are so connected that the heat passing up through one of the passages 5 will be admitted to the rear end of the connecting passage 6, thence it passes to the front of the oven structure, and thence is returned through the passage 6ᵃ to the rear, and thence connects with the chimney or escape flue 14. These escape flues may be two in number if desired, and the passages 6—6ᵃ upon the opposite sides of the central portion of the structure will connect with the escape flues as shown.

If it be desired to apply a greater heat to either one or both sides of the baking chamber, it is effected by means of passages 15 which extend from the distributing chamber through the walls upon each side of the baking chamber, and thence into side passages 16 which are parallel with the passages 6 6ᵃ and are controlled by dampers as at 17. Thus if it be desired to produce a quick heat upon one side of the baking chamber, by opening the dampers, the heat will be allowed to pass up through the passages 15, and that side of the baking chamber will be quickly raised to a higher temperature which might be used in the rapid cooking of meat or similar material.

The movement of heat through the passages 6 above the baking chamber is controlled by dampers 18 so disposed that any one or more of these passages may be closed, and the movement and heat there-through arrested.

In order to allow the escape of any steam or vapor which might otherwise collect in the baking chamber, we have shown the passage 19 which opens upwardly from the dome of the arch and is controlled by a damper as at 20.

Having thus described our invention, what we claim and desire to secure by Letters Patent is—

1. In an oven, an arched combustion chamber located in the lower part, walls, with flues connecting the rear end of said chamber with horizontal flues above the baking chamber, a plurality of substantially concentric reticulated arches located between the combustion chamber and the bottom of the baking chamber, said arches being separated from each other to form an intermediate chamber, and the reticulations of the upper arch being arranged to distribute and equalize the heat so that when the heat comes in contact with the floor of the oven, the latter will be equally heated in all parts and walls with flues passing around the sides of the oven, said flues opening into return passages formed in the arch above the baking chamber and exterior to the passages with which the combustion chamber is directly connected.

2. In a baking oven, an arched combustion chamber, a plurality of heat distributing chambers located between the combustion and the baking chambers, with intermediate substantially concentric reticulated roofs, the uppermost of said roofs having its reticulations arranged to distribute and equalize the heat so that when the heat comes in contact with the floor of the oven, the latter will be equally heated in all parts, said baking chamber having an arched or dome-shaped roof, with independent series of return passages extending horizontally therein, independent flues connecting the combustion chamber with said passages, and dampers whereby heat may be diverted to either series of flues.

3. In a baking oven, an arched or dome-shaped baking chamber having a floor inclining upwardly from the front to the rear, and a downwardly inclined passage connecting the front of said floor, with a door-opening thereto, said door opening extending transversely the full width of the chamber, an arched combustion chamber located in the lower part of the structure, a plurality of heat distributing chambers located between the combustion and baking chambers and having reticulated roofs, a central series of horizontal parallel passages formed in the roof of the baking chamber, flues formed in the rear wall connecting the end of the combustion chamber with said passages, other series of parallel passages located within the baking chamber roof, and above opposite sides of the chamber, flues connecting the uppermost of the distributing chambers with said exterior passages, and dampers whereby heat may be diverted through the central or the side passages.

4. In an oven, a combustion and baking chamber, a plurality of chambers located between the combustion and the baking chamber having reticulated roofs, independent parallel heat-conducting passages located in the roof of the baking chamber, flues in the rear walls connecting the combustion chamber with one series of said passages, other flues in the side walls connecting the uppermost heat-distributing chamber, with the other series of superposed heat passages, dampers by which the flow of heat in said passages is controlled, and connections between the passages and chimney.

5. In a baking oven, an arched baking chamber having an inclined floor and a transverse door-opening extending across the front, a combustion chamber located in the lower part of the structure, a plurality of superposed distributing chambers located between the combustion and the baking chamber, said distributing chambers having reticulated floors and roofs for the passage of heat, independent series of parallel heat-conducting passages located in the roof of the baking chamber, flues formed in the rear wall of the structure, with passages connecting the rear end of the combustion chamber there-through, and with one series of passages above the baking chamber, other flues formed in the side walls, and connections through said flues between the upper distributing chamber, and the other series of superposed flues, discharge flues or chimneys with which both sets of superposed passages are connected, and dampers by which the heat is diverted into either or both series of superposed flues.

6. In a baking oven of the character described, an arched oven having an inclined floor and a transverse door-opening extending across the front, a combustion chamber located in the lower part of the structure, a plurality of distributing chambers located one above the other and between the combustion chamber and the oven floor, passages through the intervening floors whereby the heat is delivered from the combustion chamber, heat-conducting passages located above the oven, connections between the combustion and distributing chambers and said passages, an escape flue located above said passages and into which the passages discharge, with controlling dampers between, a damper-controlled passage leading from the upper part of the oven into the uppermost chamber or flue, and damper-controlled connections between said passage and the chimney.

7. In an apparatus of the character described, an oven structure, an arched baking chamber located in the upper part having a roof with independent central and side passages formed above corresponding portions of the baking chamber, a combustion chamber in the lower part having openings and vertical flues in the rear wall connecting with the centrally located superposed passages, a plurality of substantially horizontal chambers located between the roof of the combustion chamber and the floor of the baking chamber, and having substantially concentric reticulated floors for the direct passage of heat there-through, the reticulations of the uppermost floor being arranged to distribute and equalize the heat so that when the heat comes in contact with the floor of the oven, the latter will be equally heated in all parts, side walls having flues connecting the uppermost of said chambers with the side passages superposed above the oven, and means for changing the direction of flow of the heat through either or all of said superposed passages.

8. In an apparatus of the character described, an oven structure, a combustion chamber in the lower part, a baking chamber above, a series of superposed chambers between the combustion chamber and the baking chamber having reticulated floors for the direct passage of heat, the baking chamber floor having downwardly projecting and separated bricks forming the lower surface of said floor, and projecting into the upper heat-distributing chamber substantially as described.

9. In an oven, a combustion and a baking chamber, an interposed heating chamber, with a reticulated floor, the reticulations of said floor being arranged to distribute and equalize the heat so that when the heat comes in contact with the floor of the baking chamber, the latter will be equally heated in all parts, a channeled roof to the baking chamber, end walls with flues connecting the combustion chamber with one series of the roof channels, side walls with flues connecting the heat-distributing chamber with the other series of channels, and controlling and diverting dampers.

In testimony whereof we have hereunto set our hands in presence of two subscribing witnesses.

CHARLES LOESCH.
ELVIN C. McCALL.

Witnesses:
E. M. LEMCKE,
N. E. W. SMITH.